June 23, 1925.

O. JACOBSEN

CONCENTRATING PAN

Filed Nov. 17, 1923

1,542,941

INVENTOR
Oystein Jacobsen
by
James C. Bradley
atty

Patented June 23, 1925.

1,542,941

UNITED STATES PATENT OFFICE.

OYSTEIN JACOBSEN, OF DAYTON, OHIO, ASSIGNOR TO THE DURIRON COMPANY, INC., A CORPORATION OF NEW YORK.

CONCENTRATING PAN.

Application filed November 17, 1923. Serial No. 675,420.

*To all whom it may concern:*

Be it known that I, OYSTEIN JACOBSEN, a citizen of the United States, and a resident of Dayton, in the county of Montgomery and State of Ohio, have made a new and useful invention in Improvements in a Concentrating Pan, of which the following is a specification.

Figure 1:
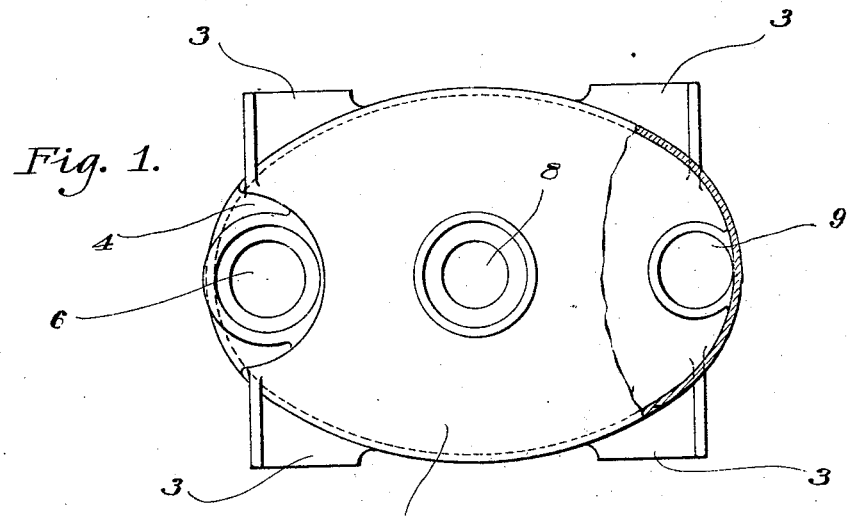
Figure 2:
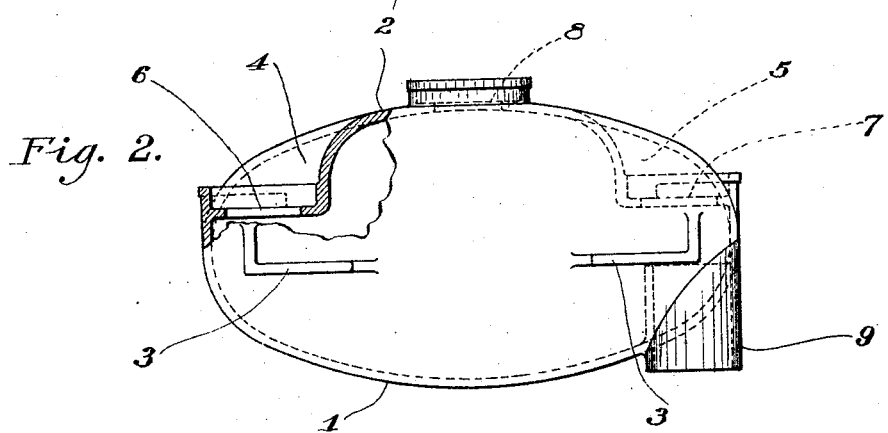
Figure 3:
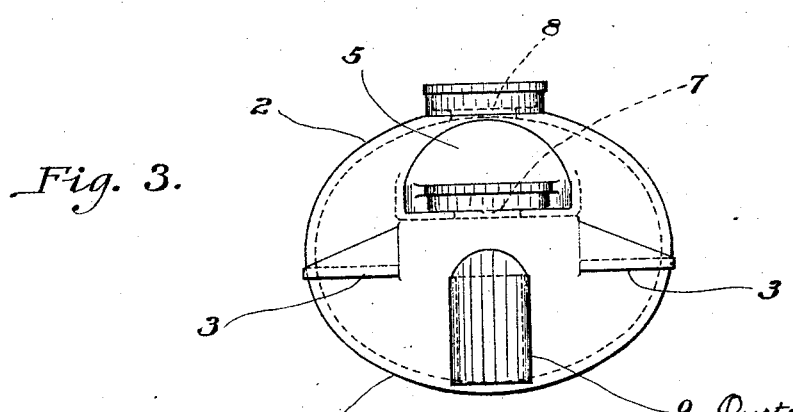

The invention relates to concentrating pans. It has for its principal objects, the provision of an improved pan construction, which can be made in a single casting, which is not liable to fracture, when exposed to varying temperature conditions, and which may be readily cleaned despite the fact that the body portion and cover are, contrary to the usual practice, made in a single piece. One embodiment of the invention is illustrated in the accompanying drawing wherein:

Figure 1 is a plan view of the pan with a portion of the top partially broken away. Fig. 2 is a side elevation, also partially broken away. And Fig. 3 is an end view.

Referring to the drawings, 1 is the body portion of the pan and 2 is the top, formed in an integral casting of corrosion resisting composition, such as high silicon iron, and being approximately ellipsoidal in shape, so that corners and angles are avoided, and the interior, with which the liquid contacts, presents a curved surface throughout. Corner plates 3 project from the sides of the exterior of the casting, substantially midway between the top and bottom of the pan, providing means for supporting it.

The top of the casting at its ends is depressed as indicated at 4 and 5, and the depressed portions are provided with the openings 6 and 7. The opening 6 constitutes the inlet to the pan, through which, the liquid to be concentrated, is supplied, while 7 constitutes a cleanout opening. The vapor formed in the pan is withdrawn from a third opening 8 in the top of the casting. The liquid from the pan passes out through the overflow tube 9, which is also a part of the casting and lies immediately below the cleanout opening 7. In operation the pans are designed to be used in series with the overflow tube 9 of one pan leading into the inlet opening 6 of the next one, and the openings 7 permit of the observation of the rate of overflow and the conditions in the pans, and also of the cleaning of the pans at the points of overflow without disturbing the relation of the series.

The ellipsoidal shape of the pan is of advantage, as a pan of this shape is less liable to fracture under varying temperature conditions, which is important, where a hard brittle material such as high silicon iron is employed, such material being subject to fracture where the casting has sharp angles or corners. The liability to fracture is also reduced, by reason of the top being integral with the body of the pan instead of separate, as in the ordinary concentrating pan. The continuously curving interior in contact with the liquid, renders the pan easy to clean, and the openings 6, 7 and 8 facilitate such cleaning. The curved body portion is also of advantage as compared with a flat body portion, in that a maximum surface is thus secured for the application of heat. Other advantages, including cheapness and simplicity, incident to the use of the single casting, will be readily apparent to those skilled in the art.

It will be understood that the construction is capable of considerable modification, as to shape and matters of detail, to meet varying requirements of use, without departing from the invention. In this connection, it will also be understood that the term "ellipsoidal" is used in its broad sense as the pan is only approximately ellipsoidal in shape, and might be made to depart still further from a true ellipsoid without materially decreasing the advantages involved in the use of this general shape.

What I claim is:

1. A concentrating pan for use as one of a series comprising a hollow integral casting, substantially ellipsoidal in shape, with its major axis in horizontal position and with its top depressed at one end and provided with an inlet opening, and with its other end provided with an overflow tube leading downward from such other end with an opening through the top wall of the pan opposite the overflow tube, said overflow tube being adapted to fit in the depression in the next pan of the series.

2. A concentrating pan for use as one of a series comprising a hollow integral casting, substantially ellipsoidal in shape, with its major axis in horizontal position and with its top depressed at one end and provided with an inlet opening, and with its other end provided with an overflow tube leading downward from such other end with the top wall of the pan above such overflow tube depressed and provided with an opening, the said overflow tube being adapted to fit in the depression in the top of the next pan of the series.

3. A concentrating pan for use as one of a series comprising a hollow integral casting, substantially ellipsoidal in shape, with its major axis in horizontal position and with its top depressed at one end, and provided with an inlet opening, and with its other end provided with an overflow tube leading downward from such other end with the top wall of the pan above such overflow tube provided with an opening and with another opening through such top wall intermediate the other opening and tube, the said overflow tube being adapted to fit in the depression in the top of the next pan of the series.

In testimony whereof, I have hereunto subscribed my name this 15th day of November, 1923.

O. JACOBSEN.